April 11, 1950     P. W. ROBINSON     2,503,770
TANK LEVEL CONTROL

Filed Jan. 29, 1947     2 Sheets-Sheet 1

Inventor
Philip W. Robinson

April 11, 1950 P. W. ROBINSON 2,503,770
TANK LEVEL CONTROL
Filed Jan. 29, 1947 2 Sheets-Sheet 2

Inventor
Philip W. Robinson
by Christy, Parmelee & Strickland
Attorneys

Patented Apr. 11, 1950

2,503,770

UNITED STATES PATENT OFFICE 2,503,770

TANK LEVEL CONTROL

Philip W. Robinson, Washington, Pa., assignor to Frazier-Simplex, Inc., Washington, Pa., a corporation of Delaware Application January 29, 1947, Serial No. 725,048

2 Claims. (Cl. 250—218)

This invention relates to the indication and/or control of the level of a fluid in a tank and is especially applicable to the control of the level of glass in a glass melting furnace, and will be particularly described in this connection.

In the operation of the glass melting furnace, especially under present conditions, it is desirable to control the level of the glass within very close limits. Usual liquid level indicators, such for example as floats, are not practical due to the high temperatures which are encountered, and to the extremely corrosive conditions which prevail in the furnace in and above the level of the bath.

The object of the present invention is to provide for the accurate determination and control of the level by a system which does not require any moving parts within the furnace itself, and which, while being capable of extremely close adjustment, is not detrimentally affected by temperature or corrosive conditions within the furnace. While the present invention is particularly applicable for use with glass melting furnaces, it may be used also for indicating or controlling the level of other liquids, especially where temperature or corrosive conditions render conventional methods impractical.

According to the present invention a light effect is utilized for detecting any change in the level. For example a beam of light is projected at an angle of less than 90° against the surface of the bath from which it is reflected. A photo-electric cell is arranged to respond to the reflected beam when the liquid level changes, and the photo-electric cell in turn controls a translating device to afford an indication of the change and/or put into operation a mechanism that will result in the level being brought back to a predetermined normal. Alternatively, a cold spot in one furnace wall may produce a shadow on the incandescent surface of the glass to which a photo-electric cell will respond.

My invention may be more fully understood by reference to the accompanying drawings, in which.

Figure 1:
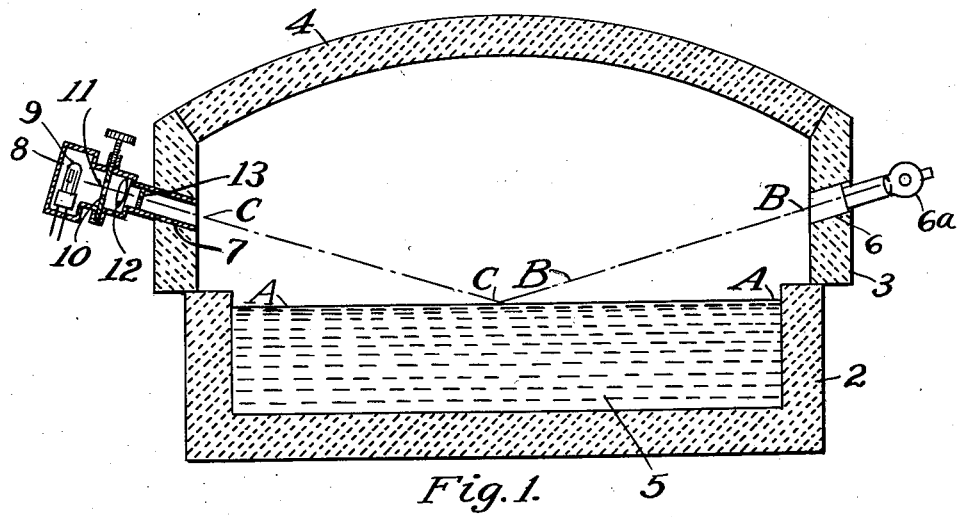
Fig. 1 represents more or less schematically one embodiment of my invention, the view being a transverse vertical section through a glass melting furnace with my invention applied thereto.

Referring to the drawings, 2 designates a container and specifically a glass melting furnace of known or preferred construction, having offset side walls 3 and an arched top 4. A molten body of glass is designated 5, and the line A—A indicates the normal liquid level within the tank.

One of the side walls 3 is provided with an inclined port 6, and at 6a is a projector of light which in the case of some liquids may be normal white light, but which in other cases is of a selected wave length. In the case of a glass melting furnace I prefer that the projector 6a will project a beam of violet or ultra-violet light through the port 6, the axis of the light beam being oblique to the liquid surface, that is, forming an acute angle with the surface of the liquid. The line B—B designates the axis of the projected beam of light. Much of the light so projected will be reflected as a beam from the surface of the liquid in the tank, at a like angle, the axis of the reflected beam being designated C—C. In the opposite wall of the furnace is another port 7 which is inclined similarly to the port 6, and which is so positioned that the reflected beam of light passes through the port at some predetermined level of the liquid. The port 7 opens into an enclosed structure 8 in which there is a photo-cell 9. In front of the photo-cell there may be an adjustable diaphragm or orifice plate 10 with an opening 11 therethrough, the position of which may be changed by adjusting the orifice plate. In lieu of a single plate with an orifice therethrough, opposed plates relatively movable with reference to each other may be employed. Adjustment may also be accomplished by changing the angle of the light projector. Forwardly of the orifice plate 10 is a focusing lens 12 and 13 designates a color filter which is frequently necessary or desirable, particularly in a glass melting furnace, and which will transmit only light of the color or wave length transmitted by the projector 6a.

In other words, if the projector 6a transmits a beam of ultra-violet light, the filter 13 will be substantially opaque to visible light, but will transmit the ultra-violet light. Ultra-violet light is not emitted to any concentrated degree by the surface of the molten glass, so that substantially the only light reaching the photo-cell will be the reflected beam from the projector 6a. The same condition will prevail if the projector 6a projects a beam of light from the violet end of the visible spectrum.

Figure 2:
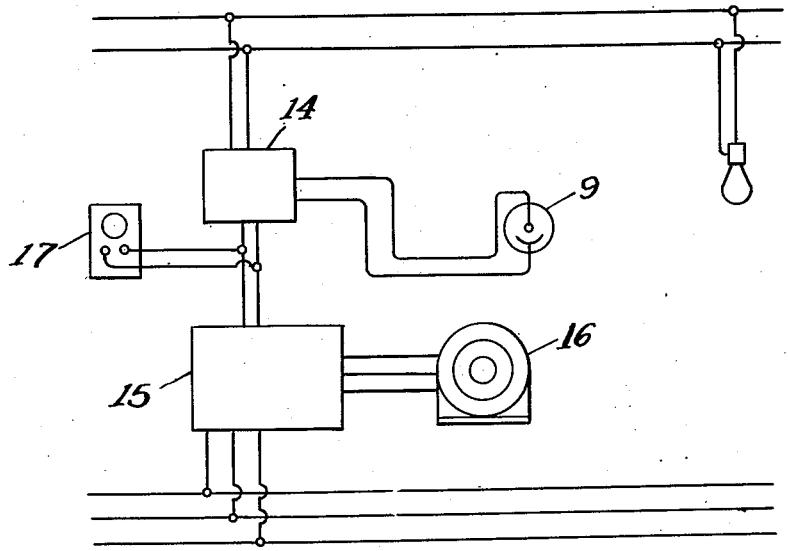
Fig. 2 is a schematic circuit diagram for the apparatus shown in Fig. 1.
Figure 3:
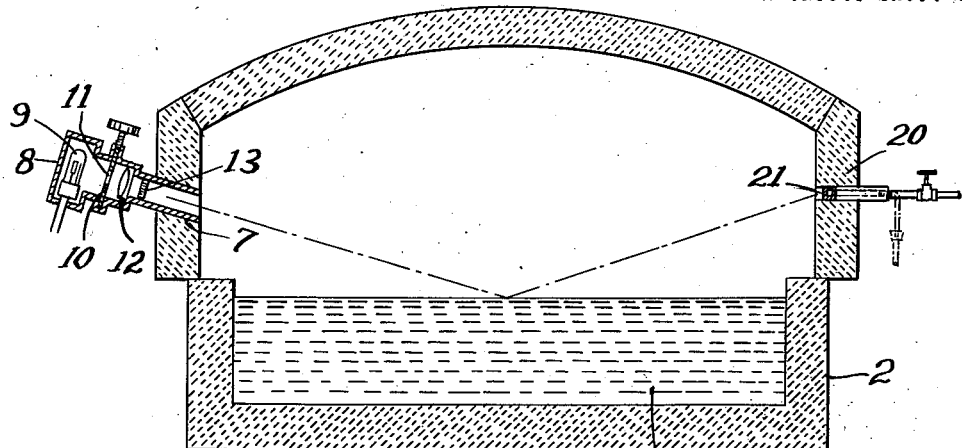
Fig. 3 is a view similar to Fig. 1 utilizing a cold spot on the furnace wall to produce a measurable light effect on the surface of the glass or other liquid.

As shown in Fig. 2 the photo-cell 9 is connected to a photo-cell relay schematically indicated at 14, these relays being well known and understood in the art, and forming no part of the present invention. The relay in turn controls a mechanism for supplying additional material to the tank. In the case of a glass furnace, the relay controls the motor which drives the batch charger for feeding batch material into the furnace. In Fig. 2 the control for the batch charger motor is schematically indicated at 15, and 16 designates the motor and charger. The batch charger itself is a mechanism well known and commonly used in the art, and forms no part of the present invention. In lieu of, or in addition to the motor control, the photo-cell relay may operate a signalling device schematically illustrated at 17, and which may be a visual signal, as for example a red light, or an audible signal, as an alarm.

Either of two systems of operation are contemplated. According to the first, if the glass level is correct, the reflected beam of light from the surface of the liquid is prevented from striking the light-sensitive photo-cell by the opening in the orifice plate or level adjustment gate 10. If the glass level drops, changing the position of the reflected beam, the light then focuses on the photo-cell which actuates the batch charger motor control to cause charge-forming materials to be fed into the tank until the liquid level is restored to normal. Of course when the normal level is again reached, the beam of light would again not fall in the photo-cell, and the charging operation would be stopped.

The other method of operation is just the reverse. That is, at the normal liquid level, the reflected beam falls directly on the photo-cell, and as long as the photo-cell is thus activated, there would be no response. If the liquid level dropped so that the reflected beam would not strike the photo-cell, the flow of current through the photo-cell circuit would be broken and this break would be utilized in a manner well understood in the art to start the feeding mechanism or increase its speed.

In some cases the signal device 17 may be a calibrated instrument in the form of a meter, and the changing level of the liquid in the tank, causing a gradual change in the amount of light falling on the photo-cell, would cause an increase or decrease in the reading on the meter 17. In this way, not only would the change in liquid level be indicated, but the actual extent of the variation may be accurately measured.

Figure 6:
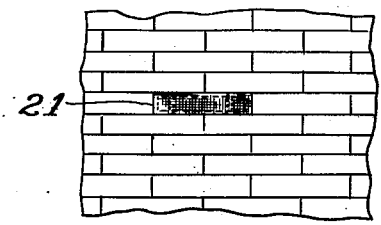
Fig. 6 is a fragmentary front elevation of the portion of the wall shown in Fig. 4.
Figure 4:
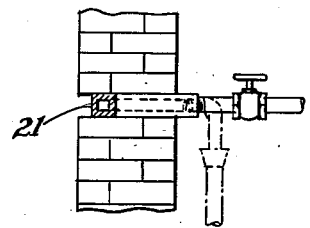
Fig. 4 is an enlarged fragmentary sectional view of the water-cooled element for producing the cold spot.
Figure 7:
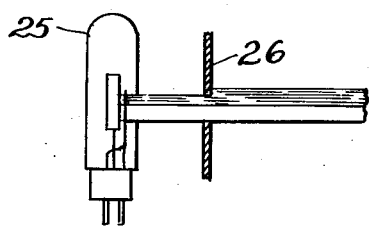
Fig. 7 is a schematic view indicating how the reflected dark band affects the photo-cell.
Figure 5:
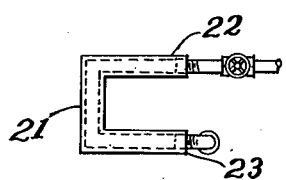
Fig. 5 is a plan view of the cold element.
Figure 8:
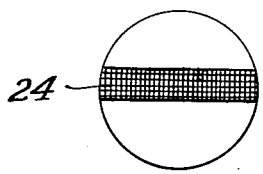
Fig. 8 is a representation of the image cast on the surface by the black object.

In the modification shown in Figs. 3 to 7 inclusive, one wall 20 of the furnace is provided with an object which contrasts with the area immediately surrounding it by being darker instead of lighter. Thus instead of there being a projector of light, there is a water-cooled element, such as the water-cooled metal brick 21 with water inlet and outlet connections 22 and 23, respectively; it will be in marked optical contrast to the incandescent interior walls of the furnace. As shown in Fig. 6, this results in a dark band or measurably different light pattern 24 on the surface of the glass in the tank.

As long as this pattern or image remains in predetermined relation to the photo-cell 25 and its gate 26 there is no response, but a shift in the level of the glass will change the light effect on the photo tube and give an indication or initiate corrective responses, the same as where a reflected beam of light is used, and similar indicating and control circuits are used.

Thus my invention provides a photo-electric cell level indication in which the vertical shift of a light pattern on the surface of the liquid effects a response of the photo-cell and the circuit in which it is included.

While I have indicated my invention as being particularly applicable to glass melting furnaces where temperature conditions and flame conditions are particularly destructive, the tank may be any suitable receptacle for liquids, and the invention may also be particularly useful in tanks containing acids or other chemicals where the liquids or fumes above the liquids are highly corrosive. Moreover, the control may be used on a glass feeder, as well as, or alternatively to, being used on a tank, and it may be in any appropriate position. Also, as previously indicated, the photo-electric cell may be used to operate either an indicator or a mechanism for governing the supply of material to the tank, or both, and I use the term "photo-cell responsive means" or "translating means" in the accompanying claims to indicate either an indicator or a feeder.

While I have shown and specifically described one particular embodiment of my invention, it will be understood that this is a typical illustration, and that my invention is not restricted to the particular form or embodiment shown. This application is a continuation of my application Serial No. 697,854, filed September 19, 1946.

I claim:

1. A furnace for molten material having refractory walls extending above the surface of the molten material, a photo-electric cell exposed through one wall of the furnace to a portion of the surface of the molten material in the furnace, means on an opposite wall of the furnace for creating an optical pattern on the surface of the liquid to which the photo-electric cell responds, and a circuit actuated by the photo-electric cell, said means for producing an optical pattern including a cold element contrasting to the incandescent walls of the furnace.

2. Apparatus for regulating the operation of a batch charging motor to maintain a predetermined level of molten glass in a glass furnace having a port therein comprising means for producing a cold spot on the furnace wall to produce a shadow on the surface of the glass, a photo-electric cell for viewing said shadow through said port and operative in response to movement of said shadow due to the level of the glass changing from a predetermined level, and a relay operable by said cell for controlling operation of the batch charging motor to maintain the level of the molten glass constant.

PHILIP W. ROBINSON.

REFERENCES CITED

The following references are of record in the file of this patent:

UNITED STATES PATENTS

| Number | Name | Date |
| --- | --- | --- |
| Re. 19,788 | Amsler | Dec. 17, 1935 |
| 1,706,857 | Mathe | Mar. 26, 1929 |
| 1,739,373 | Race | Dec. 10, 1929 |
| 1,928,016 | Halbach et al. | Sept. 26, 1933 |
| 1,939,088 | Styer | Dec. 12, 1933 |
| 1,991,192 | Bucky | Feb. 12, 1935 |
| 2,037,925 | Rentschler | Apr. 21, 1936 |
| 2,118,651 | Macchi | May 24, 1938 |

FOREIGN PATENTS

| Number | Country | Date |
| --- | --- | --- |
| 853,118 | France | Mar. 11, 1940 |
| 128,833 | Australia | Sept. 2, 1948 |